(12) United States Patent
Blomquist et al.

(10) Patent No.: US 7,140,392 B2
(45) Date of Patent: Nov. 28, 2006

(54) VALVE DEVICE

(75) Inventors: Micael Blomquist, Kvissleby (SE); Urban Ericson, Njurunda (SE)

(73) Assignee: STT Emtec AB, Sundsvall (SE)

( * ) Notice: Subject to any disclaimer, the term of this patent is extended or adjusted under 35 U.S.C. 154(b) by 50 days.

(21) Appl. No.: 11/091,664

(22) Filed: Mar. 28, 2005

(65) Prior Publication Data

US 2005/0211314 A1 Sep. 29, 2005

(30) Foreign Application Priority Data

Mar. 26, 2004 (SE) .................................. 0400787

(51) Int. Cl.
*F16K 11/14* (2006.01)
*F02B 33/44* (2006.01)

(52) U.S. Cl. ................. 137/637.3; 123/598.24
(58) Field of Classification Search ............... 137/607, 137/637.3; 123/568.19, 568.24, 568.26; 251/313

See application file for complete search history.

(56) References Cited

U.S. PATENT DOCUMENTS

| | | | |
|---|---|---|---|
| 3,633,626 A * | 1/1972 | Zirps et al. ............... | 137/637.3 |
| 3,934,851 A * | 1/1976 | Illing ......................... | 251/248 |
| 4,020,809 A | 5/1977 | Kern et al. | |
| 4,064,851 A * | 12/1977 | Wessel .................. | 123/568.19 |
| 4,924,840 A | 5/1990 | Wade | |
| 5,036,816 A * | 8/1991 | Mann ......................... | 123/361 |
| 5,205,265 A | 4/1993 | Kashiyama et al. | |
| 5,269,347 A * | 12/1993 | Beasley ...................... | 137/864 |
| 5,427,141 A | 6/1995 | Ohtsubo | |
| 5,647,399 A * | 7/1997 | Andersen .................. | 137/637.3 |
| 5,779,535 A * | 7/1998 | Bendell et al. ............. | 454/121 |
| 6,135,415 A * | 10/2000 | Kloda et al. ........... | 251/129.11 |
| 6,267,352 B1 * | 7/2001 | Semeyn et al. ........ | 251/129.12 |
| 6,640,542 B1 * | 11/2003 | Coleman et al. ........... | 60/605.2 |

FOREIGN PATENT DOCUMENTS

| DE | 3237337 | 4/1983 |
|---|---|---|
| WO | WO00/28203 | 5/2000 |

* cited by examiner

*Primary Examiner*—John Fox
(74) *Attorney, Agent, or Firm*—Dilworth & Barrese, LLP.

(57) ABSTRACT

The invention relates to a valve device comprising a valve housing (2) with a first and a second flow channel (3a, 3b) and a first and second damper shaft (8a, 8b) that is rotatable relative to the valve housing (2). A first damper (7a) is arranged in the first flow channel (3a) fixed to the first damper shaft (8a) and a second damper (7b) is arranged in the second flow channel (3b) fixed to the second damper shaft (8b). A regulating member (11a) is arranged to act on said first and second damper shafts (8a, 8b) so as to achieve a rotation of either damper (7a, 7b) by rotation of one damper shaft at a time.

20 Claims, 3 Drawing Sheets

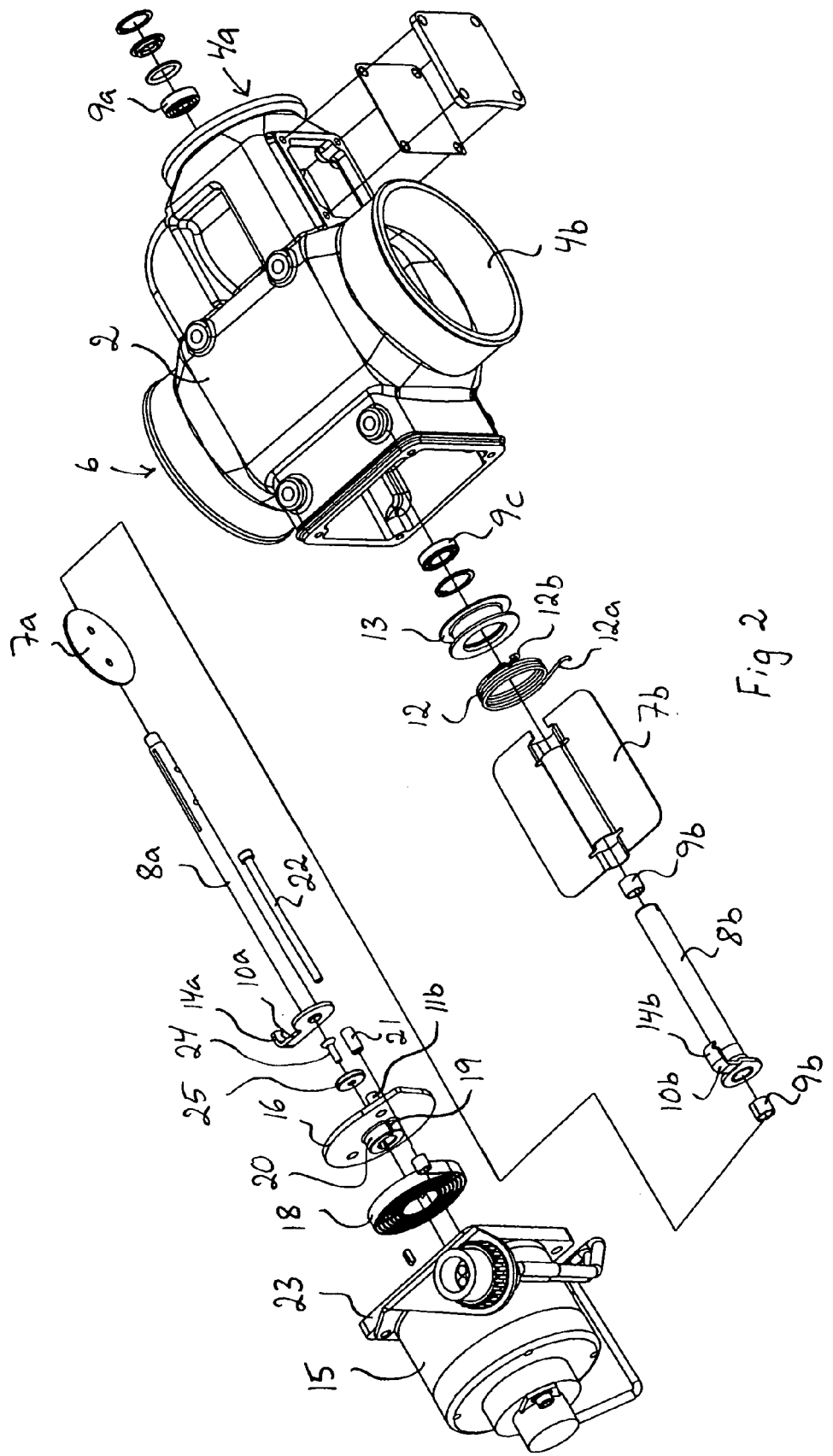

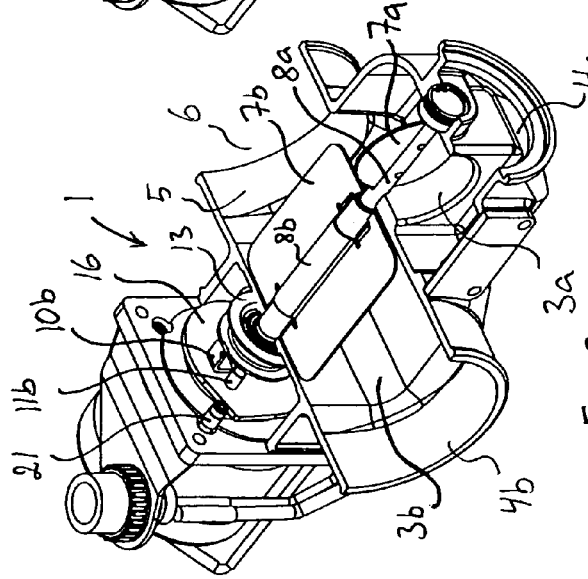
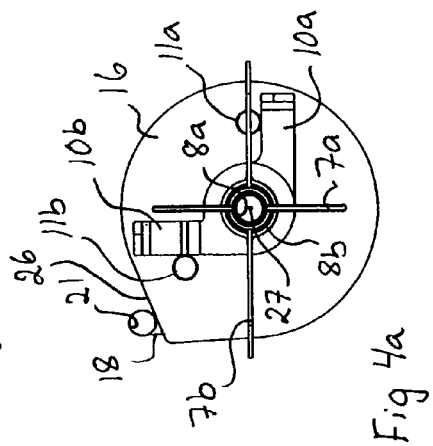
Fig 3a  Fig 4a
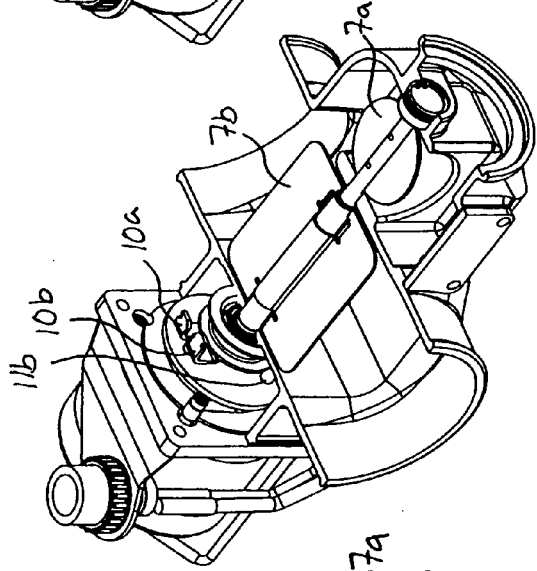
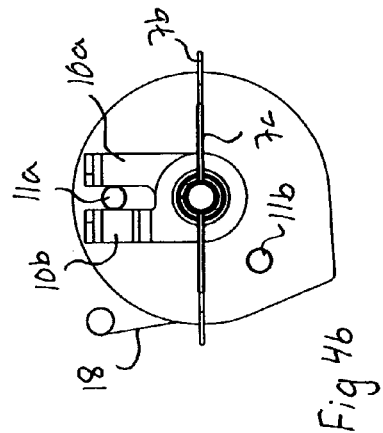
Fig 3b  Fig 4b
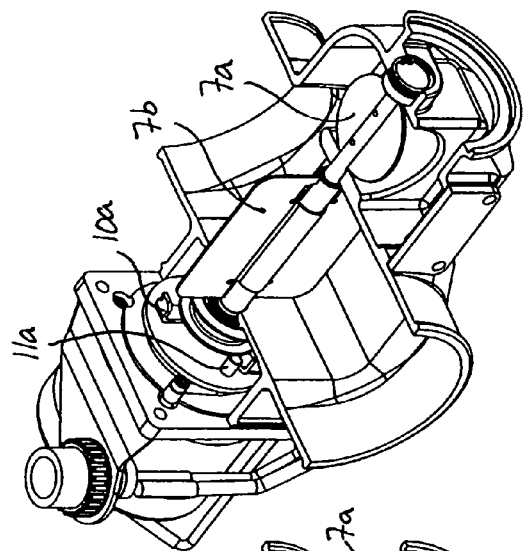
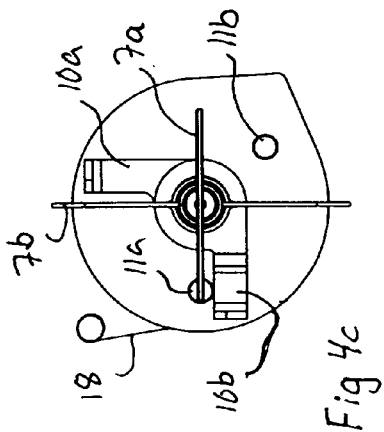
Fig 3c  Fig 4c

VALVE DEVICE

BACKGROUND OF THE INVENTION

Field of the Invention and Prior Art

The present invention relates to a valve device according to the description herein.

A valve device of the type here in question is previously known from the patent publication WO 00/28203 A1. This known valve device is intended to be included in an EGR system (EGR=Exhaust Gas Recirculation) of a combustion engine so as to regulate the relation between the amount of fresh air supplied to the combustion engine from the inlet air channel of the combustion engine and the amount of recirculated exhaust gases supplied to the combustion engine from the recirculation conduit of the EGR system. This mixture set by the valve device is supplied to the air intake of the engine. The valve device is in this case controlled by means of an EGR control device in dependence on inter alia the rotational speed and the load of the combustion engine. The valve device known from WO 00/28203 A1 comprises a first inlet channel intended to be connected to the recirculation conduit of the EGR system and a second inlet channel intended to be connected to the air inlet channel of the combustion engine. These inlet channels are in the valve device brought together into a common outlet channel. A first damper, here denominated EGR damper, is arranged in the first inlet channel and a second damper, here denominated air damper, is arranged in the second inlet channel. The flow of recirculated exhaust gases and fresh air, respectively, in the inlet channels is regulated by means of these dampers. In the known valve device, the dampers are spring-loaded into an open position and a regulating member in the form of a regulating pin, which is common to the dampers and rotatable by an adjustment motor, is arranged to act upon either damper for adjusting this damper between an open position and a closed position, while the other damper is kept in an open position by said spring-loading. In this known valve device, the dampers are consequently individually adjustable independently of each other by means of a common adjustment motor, which enables an adequate control of the valve device using only adjustment motor.

OBJECT OF THE INVENTION

The object of the present invention is to achieve a further development of the above-mentioned valve device so as to provide a function thereof improved in at least some aspect.

SUMMARY OF THE INVENTION

According to a first aspect of the invention, said object is achieved by a valve device having the features defined herein;

According to this first inventive aspect, a first damper of the valve device is by means of a first spring member spring-loaded into an open position and the rotatable regulating member, which is arranged to regulate the position of one damper at a time, is by means of a second spring member spring-loaded into a rotational position in which the regulating member by acting on the damper shaft associated with said first damper is arranged to keep said first damper in a closed position. The second spring member is here designed with a stronger spring force than the first spring member so that said first damper under the action of the second spring member is rotatable in the direction from open position to closed position against the action of the first spring member. It is hereby secured that the damper in question assumes a closed position when the rotational force exerted on the regulating member by the actuator ceases, for instance due to a breakdown of the actuator or a loss of power supply to the actuator, which can be of advantage in certain applications. In the valve device according to the above-mentioned WO 00/28203 A1, which lacks a spring member corresponding to said second spring member, both dampers will assume an open position when the rotational force exerted on the regulating pin by the adjustment motor ceases.

The valve device according to this first inventive aspect is with advantage used as a so-called EGR valve in an EGR system in order to regulate, in the manner mentioned by way of introduction, the relation between the amount of fresh air supplied to the combustion engine from the air intake channel of the combustion engine and the amount of recirculated exhaust gases supplied to the combustion engine from the recirculation conduit of the EGR system. In this usage, said first damper is intended to be arranged in the channel of the valve device that is connected to the recirculation conduit of the EGR system, i.e. this damper will in this case constitute the EGR damper. With the inventive solution, it is secured that the EGR damper will assume a closed position when the rotational force exerted on the regulating member by the actuator ceases, whereby recirculation of exhaust gases to the combustion engine is prevented when the valve device no longer is controllable by means of the actuator. Hereby, undesirably high exhaust gas contents in the intake air to the combustion engine is prevented, which otherwise might cause undesired deposit of soot in the combustion engine and in worst case damages to the combustion engine or damages to a particle filter arranged in the exhaust gas conduit from the combustion engine due to clogging thereof.

According to a second aspect of the invention, said object is achieved by a second valve device having the features defined herein.

According to this second inventive aspect, the valve device comprises a first regulating member, which is rotatable relative to the valve housing and which is arranged to act on the damper shafts of the valve device so as to achieve a rotation of either damper of the valve device by rotation of one damper shaft at a time, and a second regulating member, which is rotatable together with the first regulating member relative to the valve housing. The second regulating member is here arranged, by acting on the second damper shaft, to force the associated second damper to assume an open position when the first damper under the action of the first regulating member is made to assume a closed position. Hereby, it is secured that the second damper will assume an open position when the first damper assumes a closed position, which can be of advantage in certain applications. With this solution it will furthermore be possible to close the first damper and at the same time open the second damper even if a return spring associated to any of the dampers would be damaged. In the valve device according to the above-mentioned WO 00/28203 A1, which lacks a regulating member corresponding to said second regulating member, it is required that the return spring of the second damper is in working order to make possible a regulation of the second damper into an open position.

The valve device according to this second inventive aspect is with advantage used as a so-called EGR valve in an EGR system in order to regulate, in the manner mentioned by way of introduction, the relation between the amount of fresh air supplied to the combustion engine from the air intake channel of the combustion engine and the amount of recirculated exhaust gases supplied to the engine from the recirculation conduit of the EGR system. In this usage, said first damper is intended to be arranged in the channel of the valve device that is connected to the recirculation conduit of the EGR system, i.e. the first damper will in this case constitute the EGR damper, whereas said second damper is intended to be arranged in the channel of the valve device that is connected to the air inlet channel of the combustion engine, i.e. the second damper will in this case constitute the air damper. With the inventive solution, it is secured that the air damper will assume an open position when the EGR damper is made to assume a closed position, whereby the required supply of inlet air to the combustion engine can be secured without requiring functionality of the return springs in the valve device.

Preferred embodiments of the inventive valve device will appear from the subsequent description.

A closed position of a damper will in this description and the subsequent claims refer to a position in which the damper completely or at least essentially closes the associated flow channel so that fluid flow through the flow channel is prevented or at least essentially prevented. A closed position of a damper will consequently also embrace a position in which the damper does not completely close the flow channel and allows a smaller fluid flow through it. An open position of a damper will in this description and the subsequent claims refer to a position in which the damper does not counteract or at least only to a smaller extent counteracts fluid flow through the associated flow channel.

BRIEF DESCRIPTION OF THE DRAWINGS

The invention will in the following be more closely described by means of embodiment examples with reference to the appended drawings. It is shown in.

DETAILED DESCRIPTION OF PREFERRED EMBODIMENTS

Figure 1:
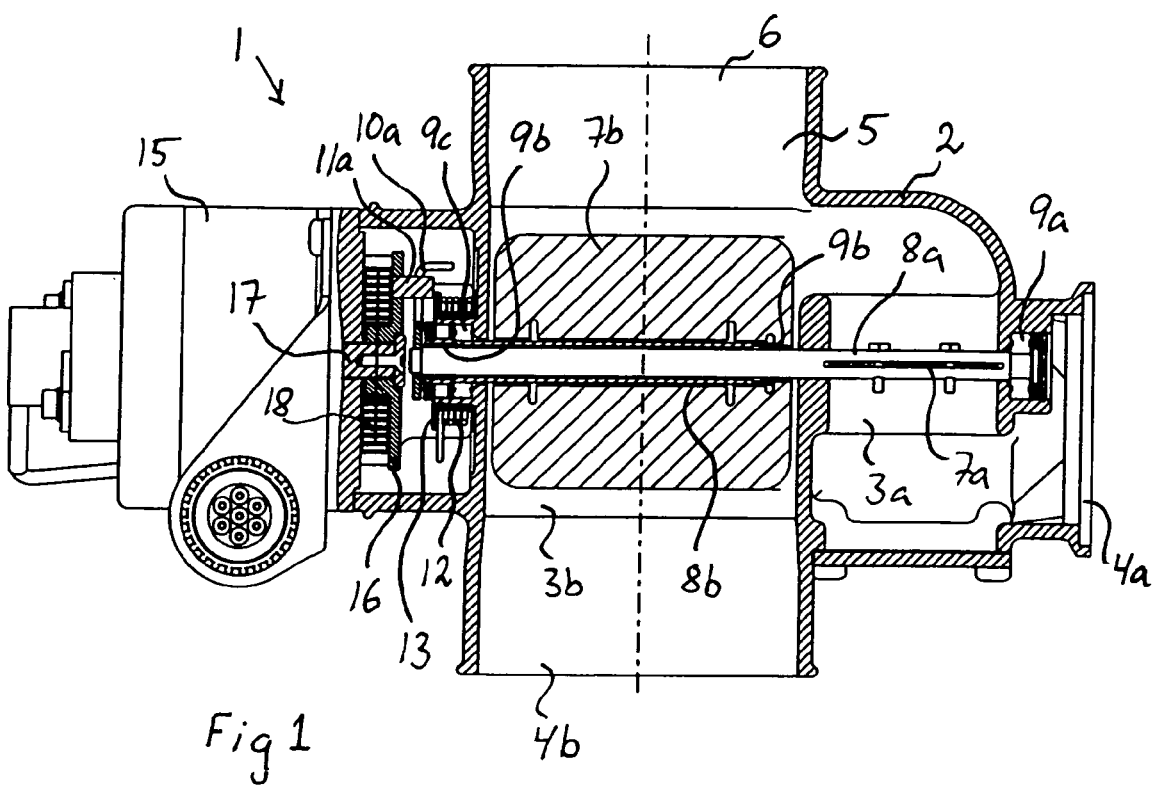
FIG. 1 a partly cut planar view of a valve device according to a preferred embodiment of the present invention, FIG. 2 an exploded view of the valve device according to FIG. 1, FIGS. 3a–3c cut perspective views of the valve device according to FIG. 1 illustrating different adjustment positions of the dampers of the valve device, and FIGS. 4a–4c end views of the dampers of the valve device with associated regulating members shown in the adjustment positions according to FIGS. 3a–3c.

FIG. 1 illustrates a valve device 1 according to the present invention. This valve device 1 comprises a valve housing 2 with a first flow channel 3a and a second flow channel 3b. The first flow channel 3a is intended to receive a fluid entering the valve device via a first inlet opening 4a of the valve housing, and the second flow channel 3b is intended to receive a fluid entering the valve device via a second inlet opening 4b of the valve housing. The flow channels 3a, 3b are at their downstream ends connected to a common channel 5, which extends further on to an outlet opening 6 of the valve housing. Fluid entering the valve housing via the inlet openings 4a, 4b will consequently be brought together and mixed after the passage through the flow channels 3a, 3b so as to thereafter flow out of the valve housing via the outlet opening 6.

A first damper 7a, which is fixed to a first damper shaft 8a, is arranged in the first flow channel 3a, and a second damper 7b, which is fixed to a second damper shaft 8b, is arranged in the second flow channel 3b. The respective damper shaft 8a, 8b is rotatably mounted relative to the valve housing 2 and by rotation of the respective damper shaft 8a, 8b the associated damper 7a, 7b is rotated, whereby the fluid flow through the respective flow channel 3a, 3b can be regulated. The respective damper 7a, 7b is connected in a rotationally rigid manner to the associated damper shaft 8a, 8b. In the illustrated embodiment, the damper shafts 8a, 8b are mutually concentric and the dampers 7a, 7b are consequently rotatable about a common axis of rotation. The second damper shaft 8b is here tube-shaped and the first damper shaft 8a is arranged to extend through and inside the second damper shaft 8b. The first damper shaft 8b is via a first bearing 9a, preferably in the form of a ball bearing, rotatably mounted relative to the valve housing 2, and via one or several second bearings 9b, preferably in the form of slide bearings, rotatably mounted relative to the second damper shaft 8b. The second damper shaft 8b is in its turn via a third bearing 9c, preferably in the form of a ball bearing, rotatably mounted relative to the valve housing 2. Said first bearing 9a is here arranged at one end of the first damper shaft 8a and said third bearing 9c is arranged at the opposite end of the second damper shaft 8b.

The first damper shaft 8a is at one end provided with a first regulating arm 10a and the second damper shaft 8b is at its corresponding end provided with a second regulating arm 10b, which regulating arms 10a, 10b extend in the radial direction from the respective damper shaft. The respective regulating arm 10a, 10b is fixed in a rotationally rigid manner to the associated damper shaft 8a, 8b so that the damper shaft can be rotated by rotation of the regulating arm. The rotation of the regulating arms 10a, 10b and thereby the regulation of the position of the dampers 7a, 7b is achieved by means of a regulating member 11a that is arranged to act on the regulating arms 10a, 10b so as to achieve, by rotation of one regulating arm at a time, a rotation of either damper shaft 8a, 8b and thereby a rotation of either damper 7a, 7b. The dampers 7a, 7b are both spring-loaded into an open position, as illustrated in FIGS. 3b and 4b. The position of the valve device when both dampers 7a, 7b are in open position is in the following denominated the intermediate position of the valve device.

In the illustrated embodiment, the dampers 7a, 7b are spring-loaded into open position by means of one and the same spring member 12, which in the following is denominated first spring member. The first spring member 12 is here a torsion spring in the form of a cylindrical screw spring and is slidably mounted in a spring bushing 13. The spring bushing 13 is in its turn mounted on a ring-shaped shoulder in the valve housing 2, through which shoulder the damper shafts 8a, 8b extend. The first spring member 12 is at a first end 12a fixed to the first regulating arm 10a via a flange 14a of this regulating arm and at a second end 12b fixed to the second regulating arm 10b via a flange 14b of this regulating arm, said ends 12a, 12b of the spring member being arranged to cross each other in the mounted state. As an alternative, the dampers 7a, 7b could be spring-loaded into open position by means of a spring member each. In the last-mentioned case, these spring members could be designed with mutually difference spring force, in which case for instance the spring member arranged to return the first damper 7a to open position has a stronger spring force than the spring member arranged to return the second damper 7b to open position.

The regulating member 11a is rotatably arranged relative to the valve housing 2 and the valve device comprises a reversible actuator 15 for rotating the regulating member 11a in the desired direction. The actuator 15 is suitably an electric motor, preferably in the form of av step motor. In the illustrated embodiment the regulating member 11a is fixed to a holding member 16, which is connected in a rotationally rigid manner to an output shaft 17 of the actuator 15. The holding member 16 is here disc-shaped and the regulating member 11a protrudes from the holding member in the direction towards the dampers 7a, 7b and regulating arms 10a, 10b. In the illustrated embodiment, the holding member 16 is fixed to the outer end of the output shaft 17 of the actuator by means of a screw 24 and a washer 25.

In the intermediate position illustrated in FIGS. 3b and 4b the respective regulating arm 10a, 10b rests against a not shown stop member in the valve housing with the regulating member 11a extending into the gap between the regulating arms 10a, 10b, the respective regulating arm 10a, 10b being pressed against its stop member under the action of the spring force from the first spring member 12. From the intermediate position illustrated in FIGS. 3b and 4b, the valve device 1 is by means of the actuator 15 and the regulating member 11a manoeuvrable to the end position illustrated in FIGS. 3a and 4a. In this end position, the first damper 7a is in closed position whereas the second damper 7b remains in open position. The first damper 7a is against the action of the first spring member 12 rotatable from open position to closed position by rotation of the regulating member 11a clockwise in FIG. 3–4. From the intermediate position illustrated in FIGS. 3b and 4b, the valve device 1 is by means of the actuator 15 and the regulating member 11a also manoeuvrable to the end position illustrated in FIGS. 3c and 4c. In this end position, the second damper 7b is in closed position whereas the first damper 7a remains in open position. The second damper 7b is against the action of the first spring member 12 rotatable from open position to closed position by rotation of the regulating member 11a counterclockwise in FIG. 3–4. The valve device 1 is consequently so designed that at least one of the dampers 7a, 7b always is kept open at the same time as either damper 7a, 7b by means of the common actuator 15 is adjustable into a desired position between open position and closed position. This valve device 1 will consequently make possible a mixing of two inflowing fluids in such a manner that the fluid flow through one flow channel 3a, 3b at a time can be regulated from maximum to zero while the fluid flow through the other flow channel 3b, 3a is set to maximum.

The regulating member 11a is by means of a second spring member 18 spring-loaded into a rotational position in which the regulating member 11a by acting on the first damper shaft 8a is arranged to keep the first damper 7a in closed position. When the regulating member 11a no longer is controlled by the actuator 15, the second spring member 18 will force the regulating member 11a to assume the position illustrated in FIGS. 3a and 4a and retain the regulating member in this position, whereby the regulating member 11a by acting on the first regulating arm 10a will force the first damper 7a to assume a closed position and retain this damper in closed position. By means of the second spring member 18 the valve device 1 is consequently made to assume the end position illustrated in FIGS. 3a and 4a when the actuator 15 is switched off or put out of operation in another manner and thereby no longer exerts any force on the regulating arms 10a, 10b via the regulating member 11a. The second spring member 18 is designed with a stronger spring force than the first spring member 12 so that the first damper 7a under the action of the second spring member 18 is rotatable in the direction from the open position to the closed position against the action of the first spring member 12. In the illustrated embodiment, the second spring member 18 is arranged to act on the regulating member 11a via the holding member 16. The second spring member 18 is here arranged about the output shaft 17 of the actuator, the second spring member at one of its ends being connected in a rotationally rigid manner to the output shaft 17 of the actuator and at its other end being connected in a rotationally rigid manner to the valve housing 2. The second spring member 18 is suitably a torsion spring in the form of a flat coil spring. In the illustrated embodiment, the inner end of the second spring member is fixed in a recess 19 formed in a collar-shaped part 20 of the holding member 16 and its outer end is fixed in a spacing sleeve 21, which via a screw 22 is fixed to an end plate 23 of the actuator's motor housing.

The holding member 16 is provided with a shoulder 26, which is arranged to make contact with the spacing sleeve 21 when the holding member 16 is rotated under the action of the second spring member 18. The spacing sleeve 21 consequently constitutes a fastening member for the second spring member 18 and will at the same time function as a stop member for limiting the rotational movement of the holding member and thereby the rotational movement of the regulating member 11a under the action of the second spring member. The holding member 16 and said stop member 21 are designed in such a manner that the regulating member 11a, when it is rotated under the action of the second spring member 18, remains in the position illustrated in FIGS. 3a and 4a.

In the illustrated embodiment, the valve device 1 comprises, in addition to said regulating member 11a, which in the following is denominated first regulating member, also a second regulating member 11b, which is rotatable together with the first regulating member 11a relative to the valve housing 2. The second regulating member 11b is, as seen in relation to the axis 27 of rotation, arranged in a predetermined angular position relative to the first regulating member 11a and is here fixed to the same holding member 16 as the first regulating member 11a. The second regulating member 11b protrudes from the holding member 16 in the same direction as the first regulating member 11a. The second regulating member 11b is arranged in such an angular position relative to the first regulating member 11a that the second regulating member 11b by acting on the second damper shaft 8b will force the second damper 7b to assume an open position when the first damper 7a under the action of the first regulating member 11a is made to assume a closed position. When the first regulating member 11a is made to assume the position illustrated in FIGS. 3a and 4a, the second regulating member 11b will make contact with the second regulating arm 10b, whereby the second damper 7b is retained in the open position.

The second regulating member 11b is by means of the second spring member 18 spring-loaded into a rotational position in which the second regulating member 11b by acting on the second damper shaft is arranged to keep the second damper 7b in an open position. When the regulating members 11a, 11b are no longer controlled by the actuator 15, the second spring member 18 will force the second regulating member 11b to assume the position illustrated in FIGS. 3a and 4a and retain the second regulating member in this position, whereby the second regulating member 11b by acting on the second regulating arm 10b will force the second damper 7b to assume an open position and retain this damper in the open position.

In the case with two regulating members 11a, 11b, the second regulating arm 10b can be used as a stop member for limiting the rotational movement of the holding member 16 and the regulating members 11a, 11b under the action of the second spring member 18. In this case, the rotational movement of the holding member 16 and the regulating member 11a, 11b is stopped by the regulating member 11b making contact with the second regulating arm 10b, which in its turn rests against a not shown stop member in the valve housing 2 in the position illustrated in FIGS. 3a and 4a. In this case, it is consequently not necessary for the holding member 16 to be designed with any shoulder for co-operation with the stop member.

The respective regulating member 11a, 11b is suitably a pin.

According to an alternative, not illustrated embodiment, the actuator 15 has a through shaft extending through the entire motor housing and protruding also on the side of the motor housing facing away from the damper shafts. In this case, the second spring member 18 may as an alternative to the location illustrated in FIG. 1–4 be located on the side of the actuator's motor housing facing away from the damper shafts, for instance by being arranged about the part of the output shaft of the actuator protruding on this side of the actuator's motor housing.

The inventive valve device 1 is with advantage a so-called EGR valve, which is intended to be included in an EGR system of a combustion engine in order to regulate the relation between the amount of fresh air supplied to the combustion engine from the inlet air channel of the combustion engine and the amount of recirculated exhaust gases supplied to the combustion engine from the recirculation conduit of the EGR system. The mixture adjusted by means of the valve device 1 is supplied to the air intake of the engine. The valve device 1 is in this case controlled by means of an EGR control device in dependence on inter alia the rotational speed and the load of the combustion engine. In this usage, the first flow channel 3a is intended to be connected to the recirculation conduit of the EGR system and the second flow channel 3b is intended to be connected to the air intake channel of the combustion engine, the first damper 7a consequently constituting the EGR damper of the EGR valve and the second damper constituting the air damper of the EGR valve. However, a valve device according to the invention may of course also be used in other applications where the fluid flow through two flow channels are to be regulated.

The invention is of course not in any way limited to the preferred embodiments described above. On the contrary, several possibilities to modifications thereof should be apparent to a person skilled in the art without departing from the basic idea of the invention as defined in the appended claims.

The invention claimed is:

1. A valve device comprising:
    a valve housing with a first flow channel and a second flow channel;
    a first damper shaft, which is rotatable relative to the valve housing;
    a first damper, which is arranged in the first flow channel and which is fixed to the first damper shaft, this first damper being spring-loaded into an open position by means of a first spring member;
    a second damper shaft, which is rotatable relative to the valve housing;
    a second damper, which is arranged in the second flow channel and which is fixed to the second damper shaft;
    a regulating member, which is rotatable relative to the valve housing and which is arranged to act on said first and second damper shafts so as to achieve a rotation of either damper by rotation of one damper shaft at a time; and
    an actuator for rotating the regulating member, characterized in that
    the regulating member by means of a second spring member is spring-loaded into a rotational position in which the regulating member by acting on the first damper shaft is arranged to keep the first damper in a closed position, the second spring member being designed with a stronger spring force than the first spring member.

2. A valve device according to claim 1, characterized in that a first regulating arm is fixed to the first damper shaft and a second regulating arm is fixed to the second damper shaft, the regulating member being adapted to act on said regulating arms so as to achieve, by rotation of one regulating arm at a time, a rotation of either damper shaft and thereby a rotation of either damper.

3. A valve device according to claim 2, characterized in that the first spring member is adapted to act on the first damper shaft via the first regulating arm.

4. A valve device according to claim 1, characterized in that the regulating member is arranged on a holding member, which is connected in a rotationally rigid manner to an output shaft of the actuator, the second spring member being adapted to act on the regulating member via said holding member.

5. A valve device according to claim 4, characterized in that the valve device comprises a stop member for limiting the rotational movement of the holding member under the action of the second spring member.

6. A valve device according to claim 5, characterized in that the stop member also constitutes a fastening member for the second spring member.

7. A valve device according to claim 5, characterized in that the holding member is provided with a shoulder, which is arranged to make contact with the stop member when the holding member is rotated under the action of the second spring member.

8. A valve device according to claim 1, characterized in that said regulating member constitutes a first regulating member, and that the valve device also comprises a second regulating member which is rotatable together with the first regulating member relative to the valve housing, the second regulating member being spring-loaded by means of the second spring member into a rotational position in which the second regulating member by acting on the second damper shaft is arranged to keep the second damper in an open position.

9. A valve device according to claim 8, characterized in that the first regulating member and the second regulating member are arranged on a common holding member, which is connected in a rotationally rigid manner to an output shaft of the actuator, the second spring member being arranged to act on said first and second regulating members via said holding member.

10. A valve device according to claim 1, characterized in that the second damper by means of the first spring member or a separate third spring member is spring-loaded into an open position.

11. A valve device according to claim 1, characterized in that the damper shafts are mutually concentric.

12. A valve device according to claim 11, characterized in that on damper shaft extends through the other damper shaft.

13. A valve device according to claim 1, characterized in that the regulating member is a pin.

14. A valve device according to claim 1, characterized in that the actuator is an electric motor, preferably in the form a step motor.

15. A valve device comprising:
- a valve housing with a first flow channel and a second flow channel;
- a first damper shaft, which is rotatable relative to the valve housing;
- a first damper, which is arranged in the first flow channel and which is fixed to the first damper shaft;
- a second damper shaft, which is rotatable relative to the valve housing;
- a second damper, which is arranged in the second flow channel and which is fixed to the second damper shaft;
- a first regulating member, which is rotatable relative to the valve housing and which is arranged to act on said first and second damper shafts so as to achieve a rotation of either damper by a rotation of one damper shaft at a time: and
- an actuator for rotating the first regulating member, characterized in that
- the valve device comprises a second regulating member, which is rotatable together with the first regulating member relative to the valve housing, the second regulating member being arranged, by acting on the second damper shaft, to force the second damper to assume an open position when the first damper under the action of the first regulating member is made to assume a closed position.

16. A valve device according to claim 15, characterized in that the first regulating member and the second regulating member are arranged on a common holding member, which is connected in a rotationally rigid manner to an output shaft of the actuator.

17. A valve device according to claim 15, characterized in that the first damper and the second damper by means of a first spring member are spring-loaded into an open position.

18. A valve device according to claim 15, characterized in that the second regulating member by means of a second spring member is spring-loaded into a rotational position in which the second regulating member by acting on the second damper shaft is arranged to keep the second damper in an open position.

19. A valve device according to claim 15, characterized in that the damper shafts are mutually concentric.

20. A valve device according to claim 19, characterized in that on damper shaft extends through the other damper shaft.

* * * * *